(12) United States Patent
Iwakura et al.

(10) Patent No.: US 10,826,135 B2
(45) Date of Patent: Nov. 3, 2020

(54) BATTERY PACK

(71) Applicant: TOYOTA JIDOSHA KABUSHIKI KAISHA, Toyota (JP)

(72) Inventors: Kengo Iwakura, Toyota (JP); Isao Takahashi, Toyota (JP); Junta Katayama, Miyoshi (JP); Koji Umemura, Okazaki (JP); Yuki Okamoto, Chiryu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 26 days.

(21) Appl. No.: 16/163,849

(22) Filed: Oct. 18, 2018

(65) Prior Publication Data
US 2019/0131665 A1 May 2, 2019

(30) Foreign Application Priority Data
Oct. 26, 2017 (JP) .................. 2017-206929

(51) Int. Cl.
*H01M 10/42* (2006.01)
*H01M 2/10* (2006.01)
*H01M 2/02* (2006.01)
*H01M 2/26* (2006.01)
*H01M 10/04* (2006.01)

(52) U.S. Cl.
CPC ....... *H01M 10/425* (2013.01); *H01M 2/0237* (2013.01); *H01M 2/1077* (2013.01); *H01M 2/1083* (2013.01); *H01M 2/263* (2013.01); *H01M 10/0431* (2013.01); *H01M 10/0481* (2013.01)

(58) Field of Classification Search
CPC . H01M 2/02–0292; H01M 2/10–1088; H01M 10/60–627; H01M 10/64; H01M 10/647; H01M 10/65; H01M 10/6554–6555; H01M 10/656–6566
See application file for complete search history.

(56) References Cited

U.S. PATENT DOCUMENTS

| 2012/0129038 A1 | 5/2012 | Lim et al. |
| 2013/0078491 A1 | 3/2013 | Obata |
| 2016/0126604 A1 | 5/2016 | Hiroe |

FOREIGN PATENT DOCUMENTS

| JP | 2007-200778 A | 8/2007 |
| JP | 2013-93224 A | 5/2013 |
| JP | 2016-091665 A | 5/2016 |
| KR | 10-2012-0055770 A | 6/2012 |

*Primary Examiner* — Jonathan G Leong
*Assistant Examiner* — Jacob Buchanan
(74) *Attorney, Agent, or Firm* — Sughrue Mion, PLLC

(57) ABSTRACT

A battery pack includes a first unit battery, a second unit battery, and a spacer. The first unit battery includes a wound electrode body and a casing that accommodates an electrolyte solution. The spacer includes: a primary surface that faces the first unit battery; and plural projections, each of which is projected from the primary surface. The plural projections include: a first projection that abuts the casing in a state where the casing is not expanded; and a second projection, a height of which is lower than a height of the first projection.

9 Claims, 13 Drawing Sheets

COMPARATIVE EXAMPLE

COMPARATIVE EXAMPLE

COMPARATIVE EXAMPLE

BATTERY PACK

INCORPORATION BY REFERENCE

The disclosure of Japanese Patent Application No. 2017-206929 filed on Oct. 26, 2017 including the specification, drawings and abstract is incorporated herein by reference in its entirety.

BACKGROUND

1. Technical Field

The present disclosure relates to a battery pack that includes plural stacked unit batteries.

2. Description of Related Art

A battery pack that includes plural secondary batteries is used as a drive source for a vehicle, for example, and is mounted on a hybrid vehicle, an electric vehicle, or the like.

Each of the secondary batteries is configured that a wound electrode body and an electrolyte solution are accommodated in a rectangular casing. An appropriate pressure is applied to a surface of each of the secondary batteries, which is configured just as described, so as to induce a uniform cell reaction in the wound electrode body. More specifically, the secondary batteries and spacers, each of which is constructed of a resin or the like, are alternately stacked to constitute the battery pack, and a compressive force is applied to this battery pack in a stacking direction.

For example, in a power storage device (a battery pack) disclosed in Japanese Patent Application Publication No. 2016-091665 (JP 2016-091665 A), rectangular power storage elements (unit batteries) and spacers are alternately stacked, and plural ribs that abut the power storage element are provided on a surface of each of the spacers.

The plural ribs include: plural substantially L-shaped ribs, each of which is provided to extend from a central portion at a lower end of the spacer toward each end side of the spacer in a width direction; and plural straight ribs, each of which is provided between the plural substantially L-shaped ribs. Each of the power storage elements is pressed by these plural ribs evenly. In this way, the uniform cell reaction can be induced in the wound electrode body.

SUMMARY

It has been known that high-rate deterioration occurs to the secondary battery. In the case where the electrolyte solution that is expanded in conjunction with high-rate charging and discharging is leaked to the outside of the wound electrode body, salt concentration distribution in the wound electrode body becomes non-uniform, and salt in the wound electrode body becomes insufficient. The high-rate deterioration thereby occurs.

In the case where the entire power storage element is pressed by the plural ribs evenly as disclosed in JP 2016-091665 A, expansion of the wound electrode body is inhibited. In this case, the wound electrode body cannot hold the expanded electrolyte solution, and thus the electrolyte solution is likely to be leaked to the outside of the wound electrode body. As a result, the high-rate deterioration cannot sufficiently be inhibited.

In order to inhibit the high-rate deterioration, it is considered to secure a solution holding space for the electrolyte solution. As long as the wound electrode body can be expanded in conjunction with the expansion of the electrolyte solution, it is possible to inhibit the leakage of the electrolyte solution to the outside of the wound electrode body.

However, in the case where the number of the ribs is simply reduced or the ribs are simply shortened, it is concerned that, when the electrolyte solution and the wound electrode body, that is, the casing of the unit battery is expanded, stress is concentrated on the ribs, and the casing is consequently damaged.

The present disclosure provides a battery pack capable of inhibiting damage to a casing of a unit battery while inhibiting high-rate deterioration.

A battery pack as a first aspect of the present disclosure includes: a first unit battery; a second unit battery that opposes the first unit battery in a first direction; and a spacer arranged between the first unit battery and the second unit battery. The first unit battery includes: a wound electrode body, a winding axis of which extends along a second direction that is orthogonal to the first direction; and a casing that accommodates the wound electrode body and an electrolyte solution. The spacer includes: a primary surface that faces the first unit battery; and plural projections, each of which is projected from the primary surface toward the first unit battery side. The plural projections include: a first projection that abuts the casing in a state where the casing is not expanded; and a second projection configured that a height of the second projection is lower than a height of the first projection in the first direction and that the second projection abuts the casing to alleviate stress applied to the first projection in a state where the casing is expanded for a specified volume. The first projection is at least in each of paired first regions of the primary surface, the paired first regions being regions that respectively overlap ends of the wound electrode body in the second direction when seen in the first direction. The second projection is at least in a second region of the primary surface, the second region being a region located between the paired first regions.

Here, expansion of the casing for the specified volume means the greater expansion of the casing than that during normal charging, and the greater expansion of the casing is associated with high-rate charging, deterioration of the unit battery, which results in an increased internal pressure of the casing, or a change of the atmospheric pressure due to a difference in elevation.

With such a configuration, the first projection, which abuts the casing in the state where the casing is not expanded, is at least provided in each of the paired the first regions of the primary surface of the spacer. Here, the primary surface of the spacer faces the casing of the first unit battery, the paired first regions are the regions that respectively overlap the ends of the wound electrode body in the second direction, and the second direction matches a direction of the winding axis of the wound electrode body. In this way, both ends of the wound electrode body in the second direction can be pressed through the casing.

In addition, the second projection, the height of which is lower than the height of the first projection, and, which abuts the casing in the state where the casing is expanded for the specified volume, is provided in the second region of the primary surface of the spacer. Here, the primary surface of the spacer faces the casing of the first unit battery, and the second region is located between the paired first regions. In this way, the expansion of the casing up to the specified volume can be allowed.

In general, in the cases where high-rate charging/discharging is conducted, the electrolyte solution is expanded, and the wound electrode body can no longer hold the electrolyte solution, the electrolyte solution is leaked from both of the end sides of the wound electrode body in the second direction, and high-rate deterioration occurs.

As described above, since the expansion of the casing is allowed, expansion of the wound electrode body can also be allowed. Accordingly, even in the case where the high-rate charging/discharging is conducted, the wound electrode body can be expanded by following the expansion of the electrolyte solution. At this time, because the wound electrode body is expanded in a state where both ends thereof in the second direction are pressed, it is possible to inhibit leakage of the electrolyte solution from both of the ends of the wound electrode body. As a result, the high-rate deterioration can be inhibited.

In addition, when the casing of the first unit battery is expanded for the specified volume, the second projection abuts the casing to alleviate the stress applied to the first projection. In this way, it is possible to inhibit stress concentration on the first projection, which abuts the casing from a time the casing is not expanded, and prevent damage to the casing.

In the first aspect, the second projection may be apart from the first projection.

In a case with such a configuration, the second projection can be provided at a position opposing a portion of the casing that is likely to be expanded. In this way, it is possible to further inhibit the stress concentration on the first projection, which abuts the casing from the time the casing is not expanded, caused by an increase in an expansion volume of the casing.

In the first aspect, the second projection may be on one side of the spacer in a third direction that is orthogonal to the first direction and the second direction.

In the case where the battery pack with the above configuration is arranged such that one side in the third direction is located on a lower side in a direction of gravity, the electrolyte solution tends to be accumulated on the one side in the third direction due to the gravity. When the high-rate charging is conducted in this state, an expansion volume of the electrolyte solution is greater on the one side of the wound electrode body in the third direction than on the other side of the wound electrode body in the third direction.

Accordingly, with provision of the second projection on the one side of the spacer in the third direction, the portion of the casing, which is likely to be expanded, can be expanded up to the specified volume. In this way, the stress applied to the first projection can effectively be alleviated.

In the first aspect, heights of a plurality of second projections may differ from each other in the first direction.

In a case with such a configuration, the second projections in the different heights can be arranged in accordance with a degree of the expansion of the casing. The second projections, each of which abuts a significantly expanded portion of the casing, are formed to be lower than the second projections, each of which abuts an insignificantly expanded portion of the casing. In this way, the large expansion volumes of the wound electrode body and the casing can be secured while the stress applied to the first projection at the time when the casing is expanded for the specified volume is alleviated. Accordingly, a solution holding space for the electrolyte solution can further reliably be secured. As a result, the high-rate deterioration can further be inhibited.

In the first aspect, in a third direction that is orthogonal to the first direction and the second direction, the heights of the plural second projections may gradually be reduced in a direction away from the first projection.

In the first aspect, a plurality of the first projections may extend from both end sides of the spacer toward a central side of the spacer in the second direction and may be aligned in a third direction that is orthogonal to the first direction and the second direction.

In a case with such a configuration, an air passage through which cooling air can flow can be formed between an adjacent pair of the first projections. Thus, the first unit battery can be cooled by causing the cooling air to flow through the air passage.

In the first aspect, the second projections may include a third projection and a fourth projection. The third projection may be configured that the third projection contacts the first projection and that a height of the third projection in the first direction continues from the height of the first projection. The fourth projection may be apart from the first projection.

In a case with such a configuration, a step between the second projection and the first projection can smoothly be formed. In this way, it is possible to alleviate the stress applied to the first projection at the time when the casing is expanded for the specified volume.

In the first aspect, the third projection may extend along a third direction that is orthogonal to the first direction and the second direction.

In a case with such a configuration, it is possible to increase an area of the second projection that contacts the casing at the time when the casing is expanded for the specified volume. In this way, the stress applied to the first projection can further be alleviated.

According to the present disclosure, it is possible to provide the battery pack capable of inhibiting the damage to the casing of the unit battery while inhibiting the high-rate deterioration.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
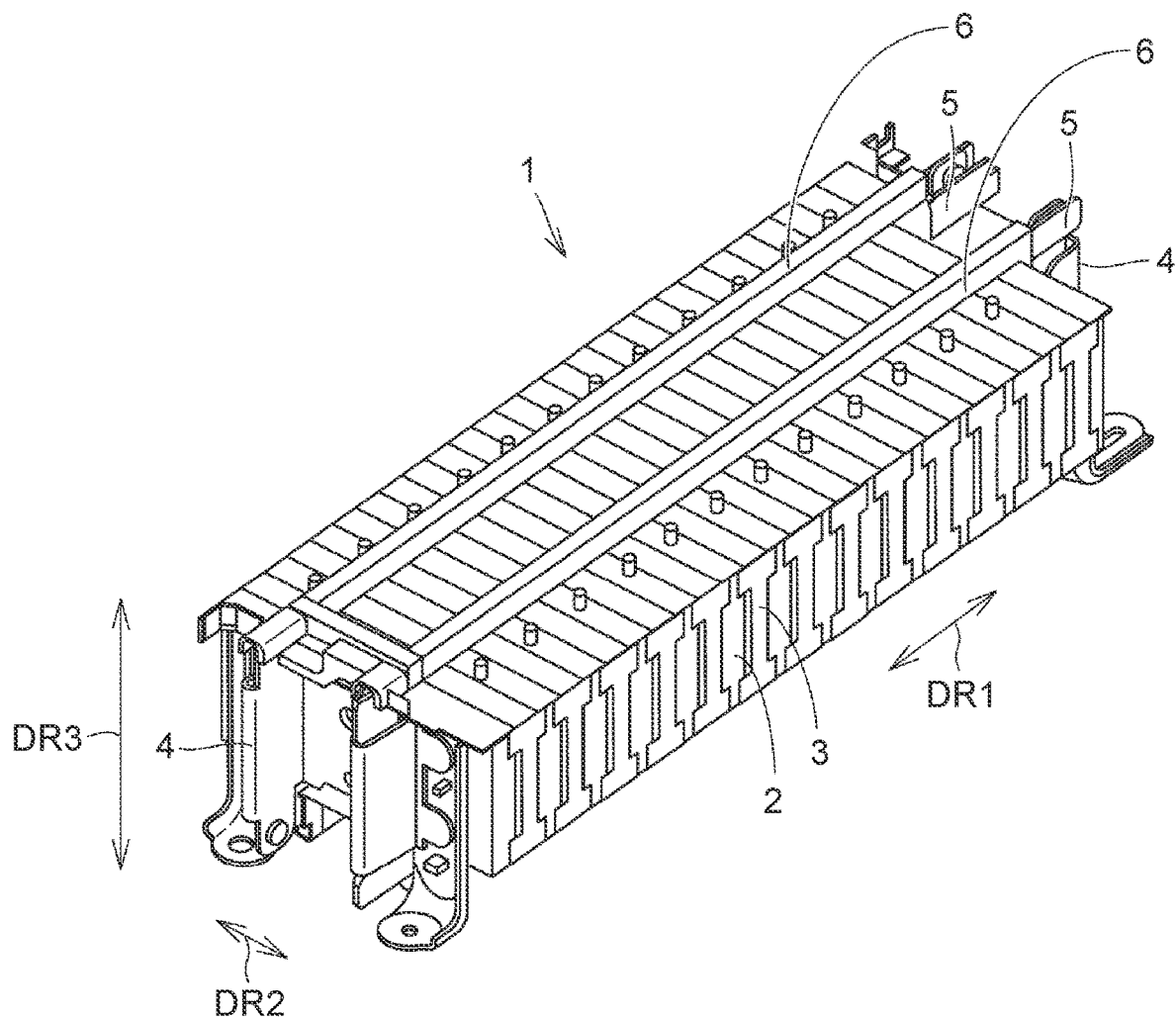
FIG. 1 is a perspective view of a battery pack according to a first embodiment.

A detailed description will hereinafter be made on an embodiment of the present disclosure with reference to the drawings. In the embodiment, which will be described below, the same or common portions will be denoted by the same reference numeral in the drawings, and an overlapping description thereon will not be made.

First Embodiment

FIG. 1 is a perspective view of a battery pack according to a first embodiment. A description will be made on a battery pack 1 according to the first embodiment with reference to FIG. 1. Note that a DR1 direction (first direction) indicates a longitudinal direction of the battery pack 1 and also indicates a stacking direction in which plural unit batteries 2 are stacked as will be described below. A DR2 direction (second direction) indicates a short direction of the battery pack 1 and is orthogonal to the DR1 direction. A DR3 direction (third direction) is orthogonal to each of the DR1 direction and the DR2 direction. In FIG. 1, the battery pack 1 is arranged such that the DR3 direction matches a direction of gravity.

As shown in FIG. 1, the battery pack 1 according to the first embodiment is formed by alternately stacking the plural unit batteries 2 and plural spacers 3 and binding a stacked body by restraint bands 5. Each of the unit batteries 2 is a sealed battery and, as will be described below, is a secondary battery in which an electrolyte solution and a wound electrode body 10 are accommodated in a casing 20 formed in a flat rectangular shape.

The plural unit batteries 2 are electrically connected in series. In this way, the battery pack 1 can output a high voltage. As a power-supply unit that supplies electric power to a travel motor, the battery pack 1 is mounted on a vehicle. Examples of the vehicle include a hybrid vehicle and an electric vehicle. The hybrid vehicle is a vehicle that includes, as power sources for travel of the vehicle, the battery pack 1 and another power source such as a fuel cell or an internal combustion engine. The electric vehicle is a vehicle that only includes the battery pack 1 as the power source of the vehicle.

The battery pack 1 includes the plural unit batteries 2, the plural spacers 3, a pair of end plates 4, the plural restraint bands 5, and plural restraint band insertion sections 6.

The plural unit batteries 2 are stacked along a first direction (the DR1 direction). Each of the plural spacers 3 is arranged between an adjacent pair of the unit batteries 2.

The paired end plates 4 hold the plural unit batteries 2 and the plural spacers 3, each of which is arranged between the adjacent pair of the unit batteries 2, therebetween. Each of the paired end plates 4 is made of aluminum, rigid plastic, or the like.

In a state of being inserted through the plural restraint band insertion sections 6, each of the plural restraint bands 5 couples the paired end plates 4. By the plural restraint bands 5, the paired end plates 4, the plural unit batteries 2, and the plural spacers 3 are fixed in a state of receiving a compressive load in the first direction.

Figure 2:
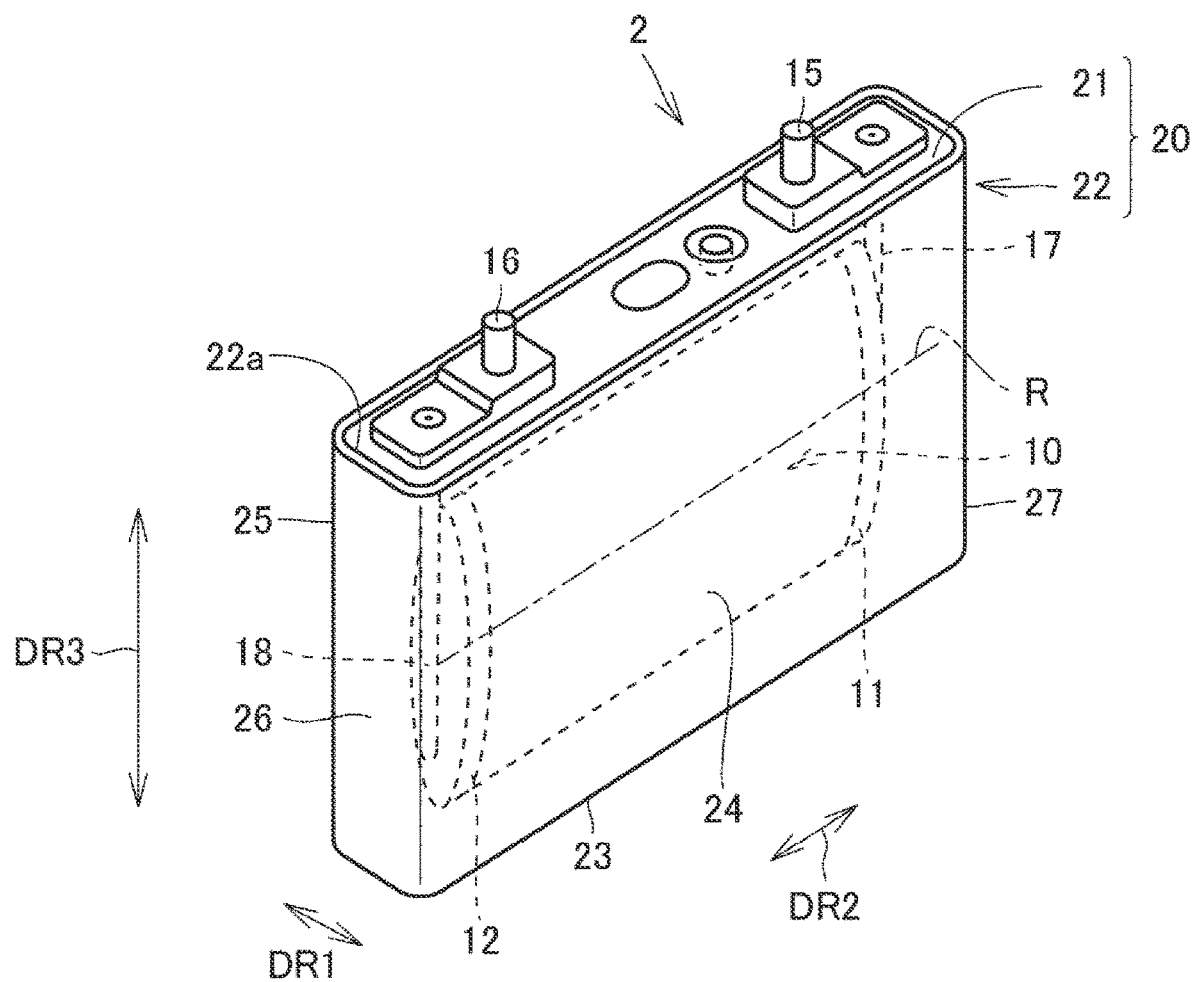
FIG. 2 is a perspective view of a unit battery according to the first embodiment.

FIG. 2 is a perspective view of the unit battery according to the first embodiment. A description will be made on the unit battery 2 according to the first embodiment with reference to FIG. 2.

As shown in FIG. 2, each of the unit batteries 2 according to the first embodiment includes the wound electrode body 10, the electrolyte solution, and the casing 20.

The wound electrode body 10 is configured by sequentially stacking a positive electrode sheet in which aluminum foil is coated with a positive-electrode active material, a separator, a negative electrode sheet in which copper foil is coated with a negative-electrode active material, and the separator and winding a stacked body about a winding axis R. The wound electrode body 10 is impregnated with the electrolyte solution.

In the wound electrode body 10, the winding axis R extends in a second direction (the DR2 direction) that is orthogonal to the first direction. A cathode electrode 11 is formed at one end of the wound electrode body 10 in the second direction. An anode electrode 12 is formed at the other end of the wound electrode body 10 in the second direction.

An uncoated portion is formed on one side of the positive electrode sheet. The uncoated portion is not coated with the positive-electrode active material, and the aluminum foil is exposed therefrom. An uncoated portion is formed on one side of the negative electrode sheet. The uncoated portion is not coated with the negative-electrode active material, and the copper foil is exposed therefrom.

The cathode electrode 11 is formed by winding the uncoated portion of the positive electrode sheet. The anode electrode 12 is formed by winding the uncoated portion of the negative electrode sheet.

The casing 20 accommodates the wound electrode body 10 and the electrolyte solution. The casing 20 includes a case body 22 in a bottomed rectangular tube shape and a sealing body 21 that seals an opening 22a of the case body 22.

The case body 22 has a bottom 23, paired side surfaces 24, 25 that oppose each other in the first direction, and paired end surfaces 26, 27 that oppose each other in the second direction. The paired side surfaces 24, 25 and the paired end surfaces 26, 27 are each provided to rise from a peripheral edge of the bottom 23.

Each of the unit batteries 2 includes a positive electrode terminal 15, a negative electrode terminal 16, a positive-electrode current collector 17, and a negative-electrode current collector 18. The positive electrode terminal 15 and the negative electrode terminal 16 are provided on the sealing body 21. The positive electrode terminal 15 is electrically connected to the cathode electrode 11 by the positive-electrode current collector 17. The negative electrode terminal 16 is electrically connected to the anode electrode 12 by the negative-electrode current collector 18.

Note that the plural unit batteries 2 are stacked in the first direction such that the positive electrode terminals 15 and the negative electrode terminals 16 are alternately aligned.

Figure 3:
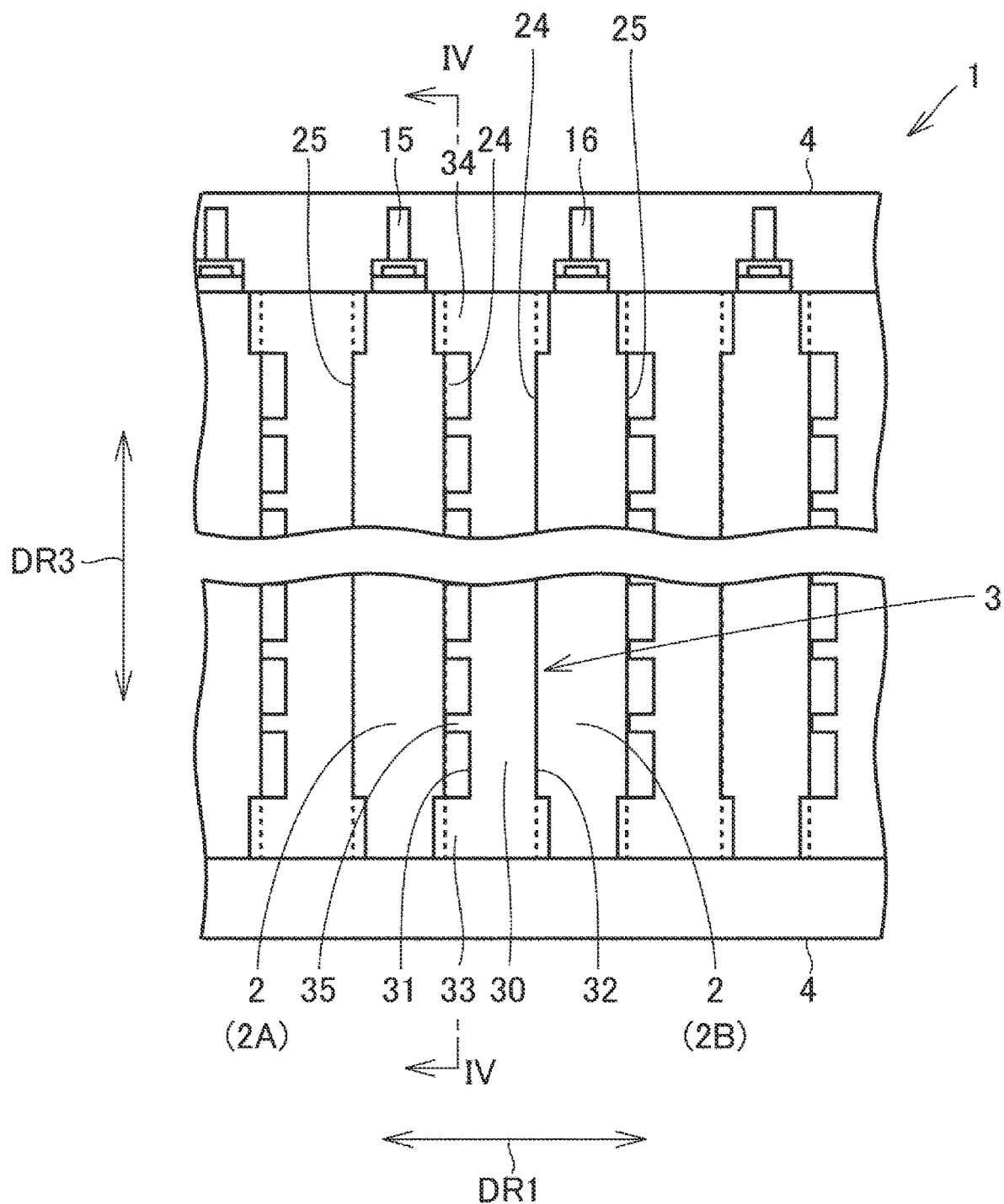
FIG. 3 is a side view of a part of the battery pack shown in FIG. 1.
Figure 4:
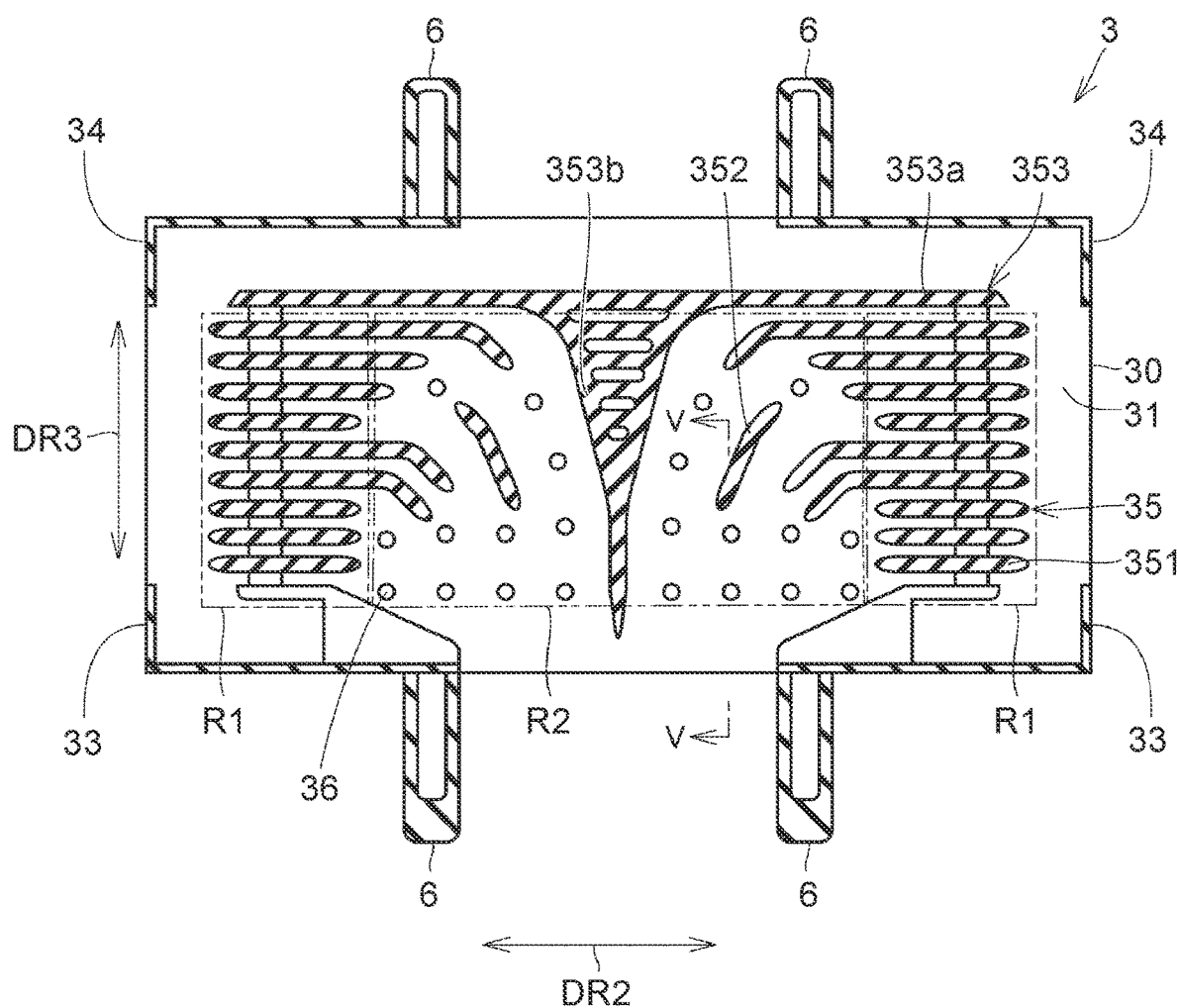
FIG. 4 is a transverse cross-sectional view of a spacer according to the first embodiment.

FIG. 3 is a side view of a part of the battery pack shown in FIG. 1. FIG. 4 is a transverse cross-sectional view of the spacer according to the first embodiment and is a cross-sectional view that is taken along line IV-IV in FIG. 3. A description will be made on the spacer 3 according to the first embodiment with reference to FIG. 3 and FIG. 4.

As shown in FIG. 3 and FIG. 4, the spacer 3 is arranged between the adjacent pair of the unit batteries 2. More specifically, the spacer 3 is arranged between a first unit battery 2A as one of the adjacent pair of the unit batteries 2 and a second unit battery 2B as the other of the adjacent pair of the unit batteries 2.

The spacer 3 is formed of an insulating material. The spacer 3 includes a plate-shaped section 30 and plural projections including plural first projections 35 and plural second projections 36. The plate-shaped section 30 has a flat plate shape that is parallel with the second direction and a third direction. The plate-shaped section 30 has a first primary surface 31 and a second primary surface 32 that are in a front-back relationship in the first direction.

The first primary surface 31 faces the casing 20 of the first unit battery 2A. More specifically, the first primary surface 31 opposes the side surface 24 of the above first unit battery 2A. The second primary surface 32 abuts the casing 20 of the second unit battery 2B. More specifically, the second primary surface 32 abuts the side surface 24 of the second unit battery 2B.

The plural first projections 35 are projected from the first primary surface 31 toward the casing 20 of the first unit battery 2A. The plural first projections 35 are at least provided in a pair of first regions R1 of the first primary surface 31.

When seen along the first direction, the paired first regions R1 are regions that respectively overlap ends of the wound electrode body 10 in the second direction. In other word, the first region R1 is region that overlaps one end of the wound electrode body 10 in the second direction, and the other first region R1 is region that overlaps the other end of the wound electrode body 10 in the second direction.

Each of the plural first projections 35 has a longitudinal shape. The plural first projections 35 include plural ribs 351, ribs 352, and a rib 353. The plural ribs 351 extend from both end sides of the spacer 3 toward a central portion side thereof in the second direction and are arranged in the third direction that is orthogonal to the first direction and the second direction.

Some of the plural ribs 351 are provided to extend beyond the paired first regions R1 to the central portion side of the spacer 3 in the second direction. The ribs 351 that extend beyond the paired first regions R1 to the central portion side of the spacer 3 in the second direction are bent toward one side in the third direction (vertically downward) when approaching the central portion side.

Each of the rib 352 is located near the central portion of the spacer 3 in the second direction from the first region R1. Each of the rib 352 is bent to the one side in the third direction when approaching the central portion side of the spacer 3 in the second direction.

The rib 353 is substantially T-shaped. The rib 353 includes: a first portion 353a that is located on the other side of the spacer 3 in the third direction and extends from the one side to the other side in the second direction; and a second portion 353b that is located on the central portion side of the spacer 3 in the second direction and extends from the other side to the one side in the third direction.

The above second portion 353b is provided in such a manner that width thereof in the second direction is reduced toward the one side from the other side in the third direction. In this way, as will be described below, a direction of cooling air that flows into the spacer 3 from the one side thereof in the third direction can gradually be changed to the second direction.

In a state where the casing 20 of the first unit battery 2A is not expanded, the plural first projections 35 abut the casing 20.

In this way, air passages, each of which is partitioned by the plural first projections 35, are formed between the casing 20 of the first unit battery 2A and the first primary surface 31 of the spacer 3. The cooling air for cooling the unit battery 2 flows through each of the air passages. The cooling air flows into from the one side of the spacer 3 in the third direction, is guided by the plural first projections 35, and flows out from both of the end sides of the spacer 3 in the second direction.

The plural second projections 36 are projected from the first primary surface 31 toward the casing 20 of the first unit battery 2A. The plural second projections 36 are at least provided in a second region R2 of the first primary surface 31. The second region R2 is a region located between the paired first regions R1. The plural second projections 36 are separately provided from each of the plural first projections 35.

Each of the plural second projections 36 has a columnar shape, for example. A diameter of each of the plural second projections 36 is approximately 2 mm, for example. A space between the adjacent second projections 36 in the second direction is equal to or longer than 5 mm and is equal to or shorter than 11 mm, for example. A space between the adjacent second projections 36 in the third direction is equal to or longer than 5 mm and is equal to or shorter than 11 mm, for example.

Note that the shape of each of the plural second projections 36 is not limited to the columnar shape, and a cross section thereof that is orthogonal to the first direction may have an oval shape such as an ellipsoidal shape, a flattened circular shape, or a track shape or may have a quadrilateral shape such as a rhomboid shape. In this case, the second projections 36 are preferably arranged such that long axes thereof follow a flow direction of the cooling air.

In addition, the shape of each of the plural second projections 36 may be a streamlined shape, a spherical shape, or a semispherical shape. In the case where each of the plural second projections 36 adopts such a shape, flow efficiency of the cooling air can be improved.

Figure 5:
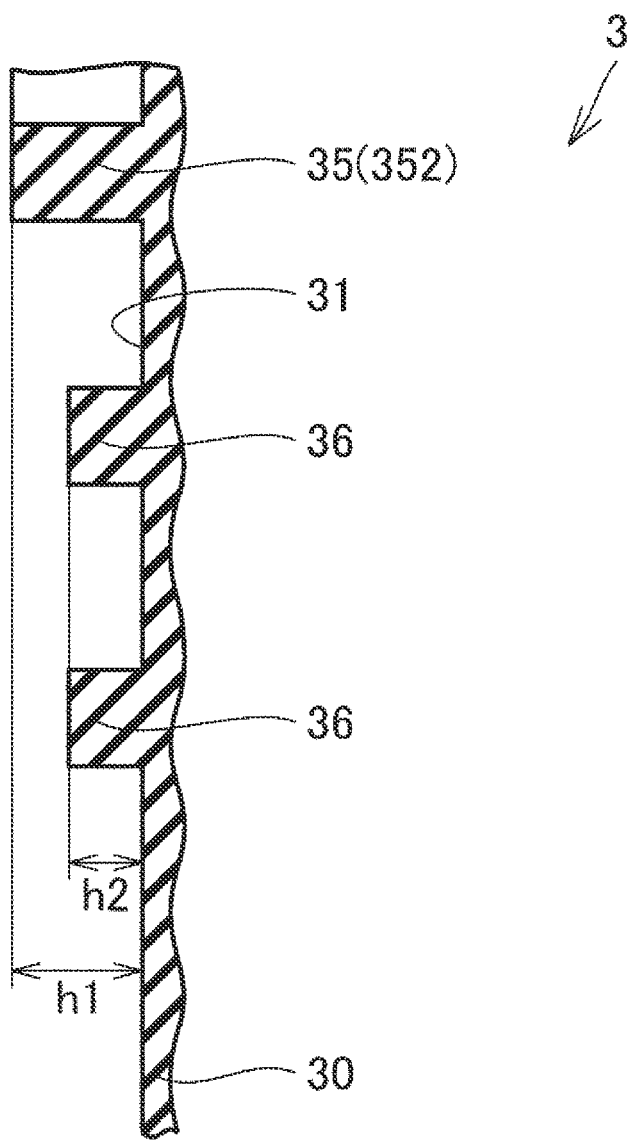
FIG. 5 is a cross-sectional view of a part of a vertical cross section of the spacer according to the first embodiment.

FIG. 5 is a cross-sectional view of a part of the spacer according to the first embodiment and is a cross-sectional view that is taken along line V-V in FIG. 4. As shown in FIG. 5, a height h2 of each of the plural second projections 36 is lower than a height h1 of each of the plural first projections 35. In this way, the plural second projections 36 are provided to abut the casing 20 of the first unit battery 2A at the time when the casing 20 is expanded for a specified volume.

As shown in FIG. 3 and FIG. 4 again, the spacer 3 has a pair of overhang sections 33 and a pair of overhang sections 34. Each of these paired overhang sections 33 and paired overhang sections 34 is a portion that restricts movement of the unit battery 2 in the second direction.

The paired overhang sections 33 are provided on the one side of the spacer 3 in the third direction. The paired overhang sections 33 are provided on both ends of the spacer 3 in the second direction and overhang in the first direction from the plate-shaped section 30.

The paired overhang sections 34 are provided on the other side of the spacer 3 in the third direction. The paired overhang sections 34 are provided on both of the ends of the spacer 3 in the second direction and overhang in the first direction from the plate-shaped section 30.

Figure 6:
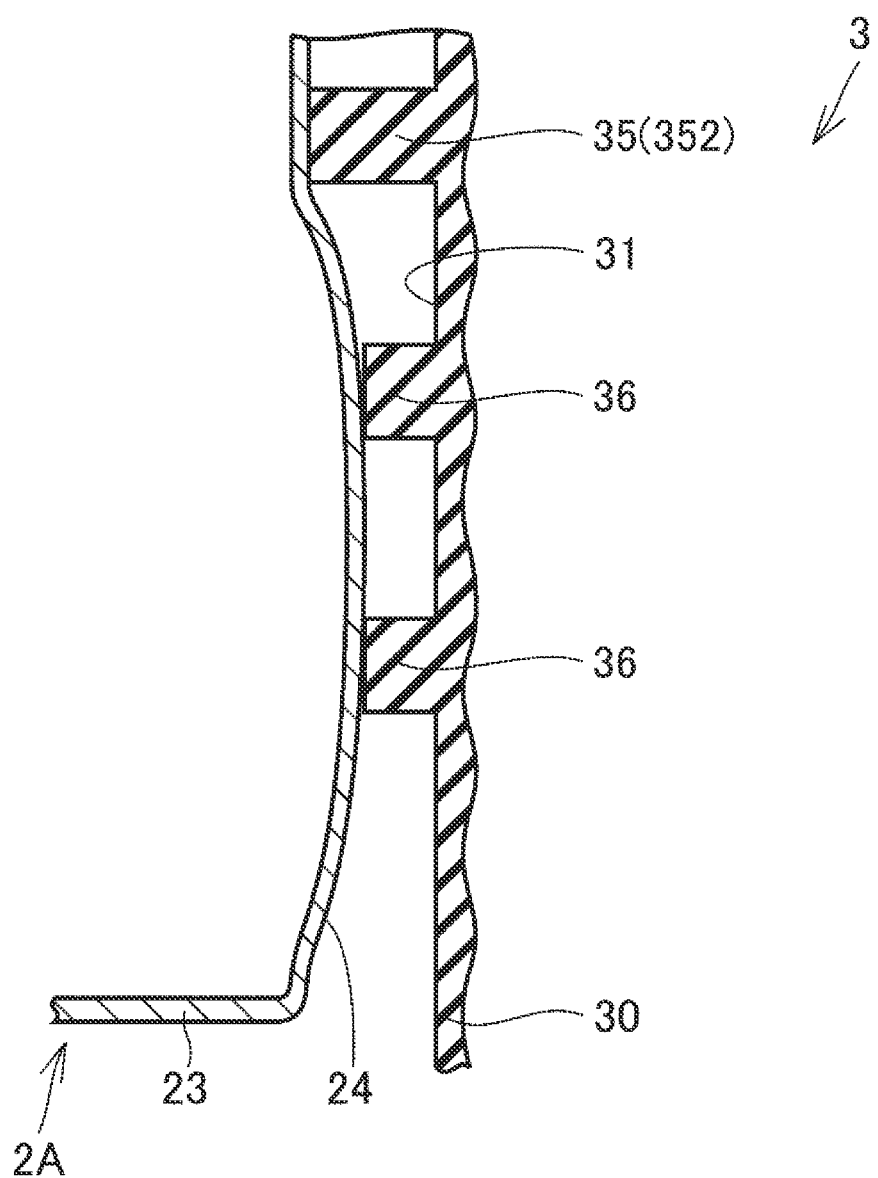
FIG. 6 is a cross-sectional view of a state according to the first embodiment where an expanded casing abuts the spacer.

FIG. 6 is a cross-sectional view of a state according to the first embodiment where the expanded casing abuts the spacer. A description will be made on a state where the expanded casing 20 according to the first embodiment abuts the spacer 3 with reference to FIG. 6.

As shown in FIG. 6, when the casing 20 of the first unit battery 2A is expanded for the specified volume, the casing 20 abuts the plural second projections 36. In this way, the expansion of the casing 20 can be restricted by the second projections 36, and stress applied to each of the first projections 35 can be alleviated. As a result, it is possible to inhibit stress concentration on the first projections 35, each of which abuts the casing 20 from a time the casing 20 is not expanded, and prevent damage to the casing 20.

In addition, since the second projections 36 are separately arranged from the first projections 35, the second projections 36 can be provided at positions opposing a portion of the casing 20 that is likely to be expanded. In this way, it is possible to further inhibit the stress concentration on the first projections 35, each of which abuts the casing 20 from the time the casing 20 is not expanded, caused by an increase in the expansion volume of the casing 20.

Note that the expansion of the casing for the specified volume means the greater expansion of the casing than that during normal charging, and the greater expansion of the casing is associated with high-rate charging, deterioration of the unit battery, which results in an increased internal pressure of the casing, or a change of the atmospheric pressure due to a difference in elevation.

Furthermore, the battery pack 1 according to the first embodiment can inhibit high-rate deterioration as will be described below.

In general, in the cases where the high-rate charging/discharging is conducted, the electrolyte solution is expanded, and the wound electrode body 10 can no longer hold the electrolyte solution, the electrolyte solution is leaked from both of the end sides of the wound electrode body 10 in the second direction, and the high-rate deterioration occurs.

In the battery pack 1 according to the first embodiment, the first projections 35, each of which abuts the casing 20 in a state where the casing 20 is not expanded, are at least provided in each of the paired the first regions R1 of the first primary surface 31 of the spacer 3. Here, the first primary surface 31 of the spacer 3 faces the casing 20 of the first unit battery 2A, the paired first regions R1 are the regions that overlap both of the ends of the wound electrode body 10 in the second direction, and the second direction matches a direction of the winding axis R of the wound electrode body 10. In this way, both of the ends of the wound electrode body 10 in the second direction can be pressed through the casing 20.

In addition, the second projections 36, the height of each of which is lower than the height of the first projection 35, and, each of which abuts the casing 20 in the state where the casing 20 is expanded for the specified volume, are provided in the second region R2 of the first primary surface 31 of the spacer 3. Here, the first primary surface 31 of the spacer 3 faces the casing 20 of the first unit battery 2A, and the second region R2 is located between the paired first regions R1. In this way, the expansion of the casing 20 up to the specified volume can be allowed. Thus, expansion of the wound electrode body 10 is also allowed.

Accordingly, even in the case where the high-rate charging/discharging is conducted, the wound electrode body 10 can be expanded by following the expansion of the electrolyte solution. At this time, because the wound electrode body 10 is expanded in a state where both of the ends thereof in the second direction are pressed, it is possible to inhibit leakage of the electrolyte solution from both of the ends of the wound electrode body 10. As a result, the high-rate deterioration can be inhibited.

As it has been described so far, the battery pack 1 according to the first embodiment can inhibit the damage to the casing 20 of each of the unit batteries 2 while inhibiting the high-rate deterioration.

Comparative Example

Figure 7:
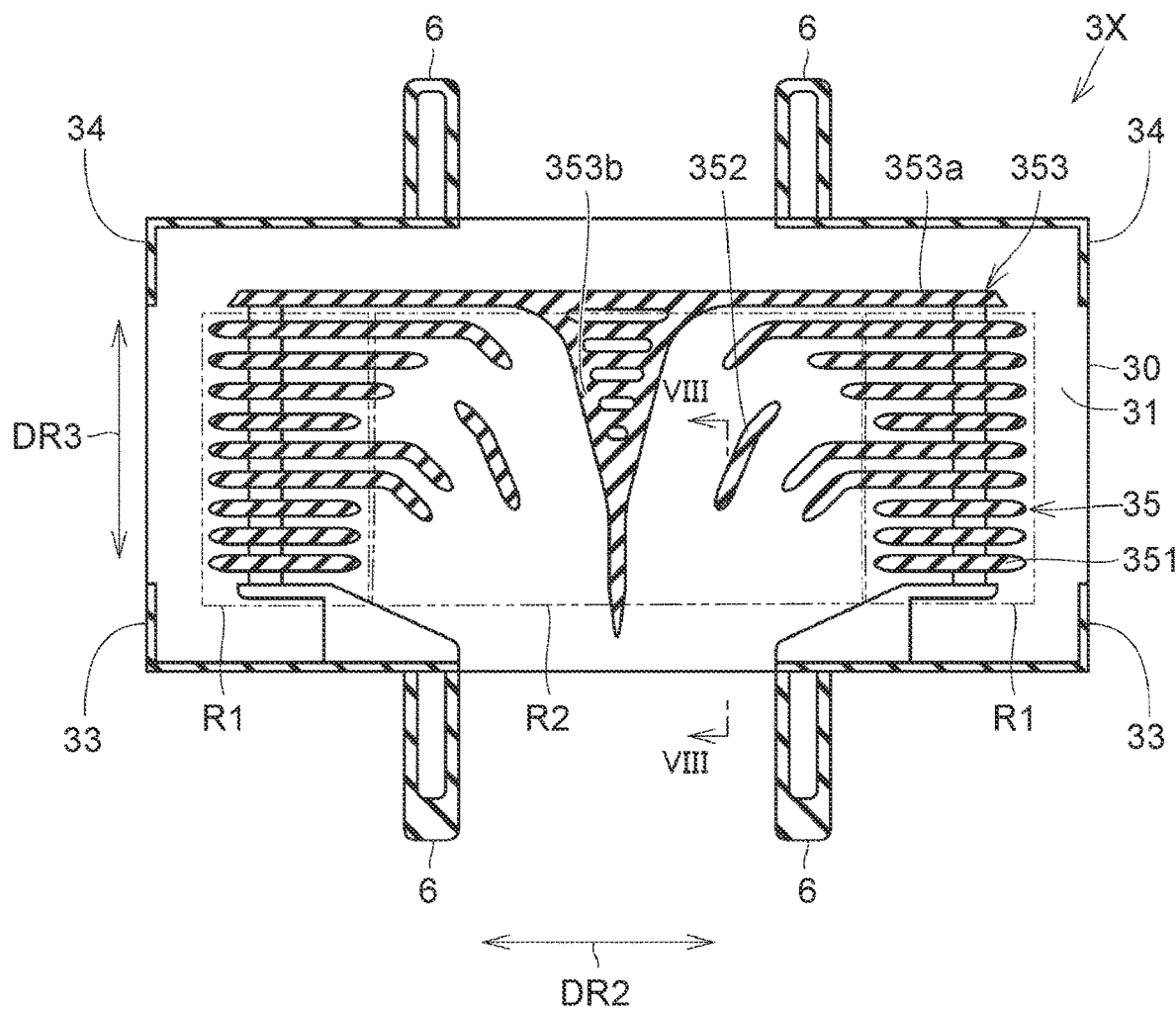
FIG. 7 is a transverse cross-sectional view of a spacer in a comparative example.
Figure 8:
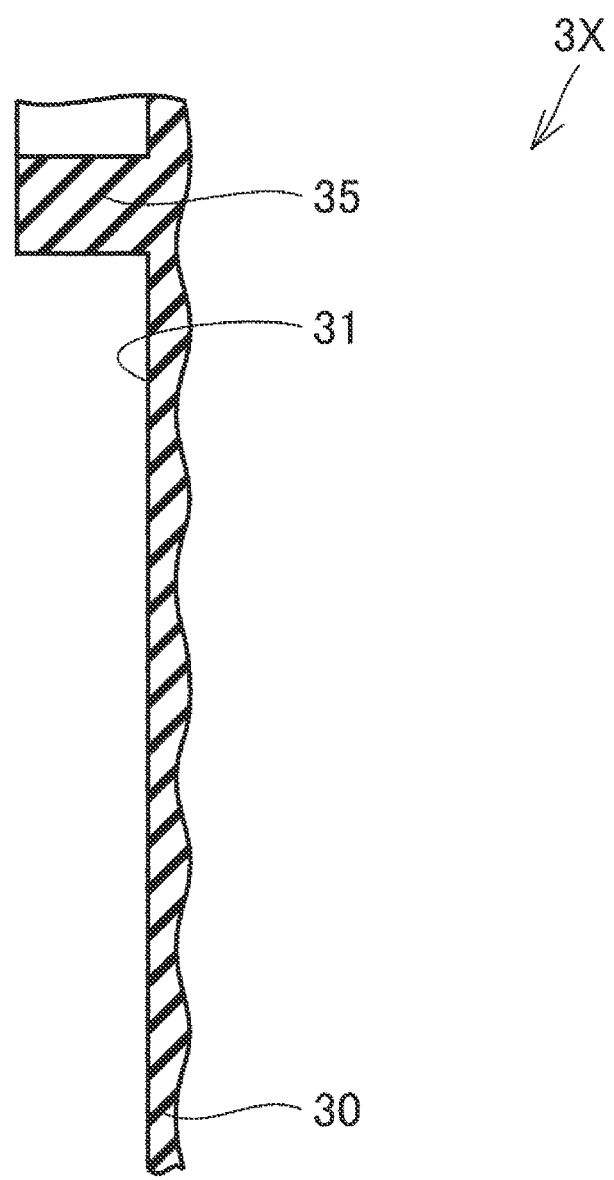
FIG. 8 is a cross-sectional view of a part of a vertical cross section of the spacer in the comparative example.

FIG. 7 is a transverse cross-sectional view of a spacer in a comparative example. FIG. 8 is a cross-sectional view of a part of a vertical cross section of the spacer in the comparative example. A description will be made on a spacer 3X in the comparative example with reference to FIG. 7 and FIG. 8.

As shown in FIG. 7 and FIG. 8, the spacer 3X according to the comparative example differs from the spacer 3 according to the first embodiment in a point that the plural second projections 36 are not provided. The rest of the configuration of the spacer 3X is substantially the same as the configuration of the spacer 3.

Figure 9:
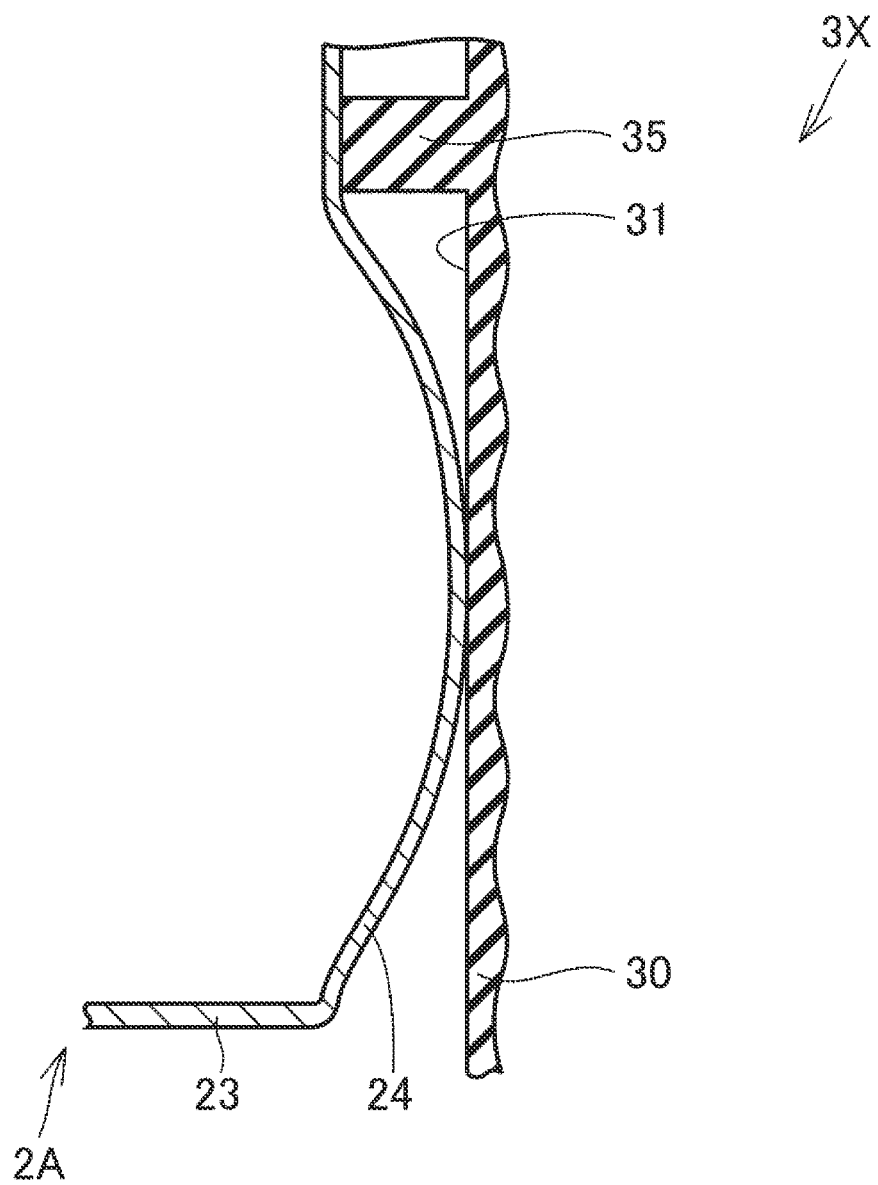
FIG. 9 is a cross-sectional view of a state in the comparative example where an expanded casing abuts the spacer.

FIG. 9 is a cross-sectional view of a state in the comparative example where an expanded casing abuts the spacer. A description will be made on a state where the expanded casing 20 in the comparative example abuts the spacer 3X with reference to FIG. 9.

As shown in FIG. 9, in the case where the casing 20 of the first unit battery 2A is expanded in a battery pack that is equipped with the spacer 3X in the comparative example, the expansion of the casing 20 is not restricted due to the lack of the plural second projections 36. Accordingly, the stress is concentrated on an end of each of the first projections 35, and the casing 20 is damaged.

First Modified Example

Figure 10:
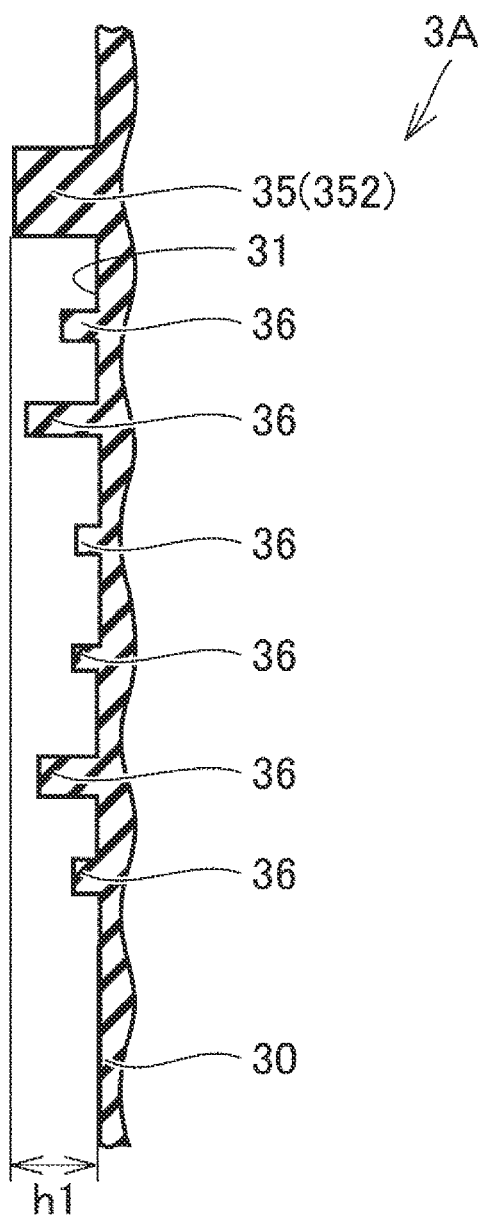
FIG. 10 is a cross-sectional view of a part of a vertical cross section of a spacer according to a first modified example.

FIG. 10 is a cross-sectional view of a part of a vertical cross section of a spacer according to a first modified example. A description will be made on a spacer 3A according to the first modified embodiment with reference to FIG. 10.

As shown in FIG. 10, the spacer 3A according to the first modified example differs from the spacer 3 according to the first embodiment in a point that the heights of the plural second projections 36 differ from each other. The rest of the configuration of the spacer 3A is substantially the same as the configuration of the spacer 3.

The plural high second projections 36 are arranged in a portion that is located on the other side in the third direction and on a side near the first projections 35 and in a portion that is located on the one side in the third direction. The low second projection 36 is arranged between the plural high second projections 36.

Also in a battery pack that is equipped with the spacer 3A according to the first modified example, the expansion of the casing 20 can be restricted by the second projections 36, and the stress applied to each of the first projections 35 can be alleviated. As a result, it is possible to inhibit the stress concentration on the first projections 35, each of which abuts the casing 20 from the time the casing 20 is not expanded, and the damage to the casing 20.

In addition, the second projections 36 in the different heights can be arranged in accordance with a degree of the expansion of the casing 20. The second projections 36, each of which abuts the significantly expanded portion of the casing 20, are formed to be lower than the second projections 36, each of which abuts the insignificantly expanded portion of the casing 20. In this way, the large expansion volumes of the wound electrode body 10 and the casing 20 can be secured while the stress applied to the first projections 35 at the time when the casing 20 is expanded for the specified volume is alleviated. Accordingly, a solution holding space for the electrolyte solution can further reliably be secured. As a result, the high-rate deterioration can further be inhibited.

Second Modified Example

Figure 11:
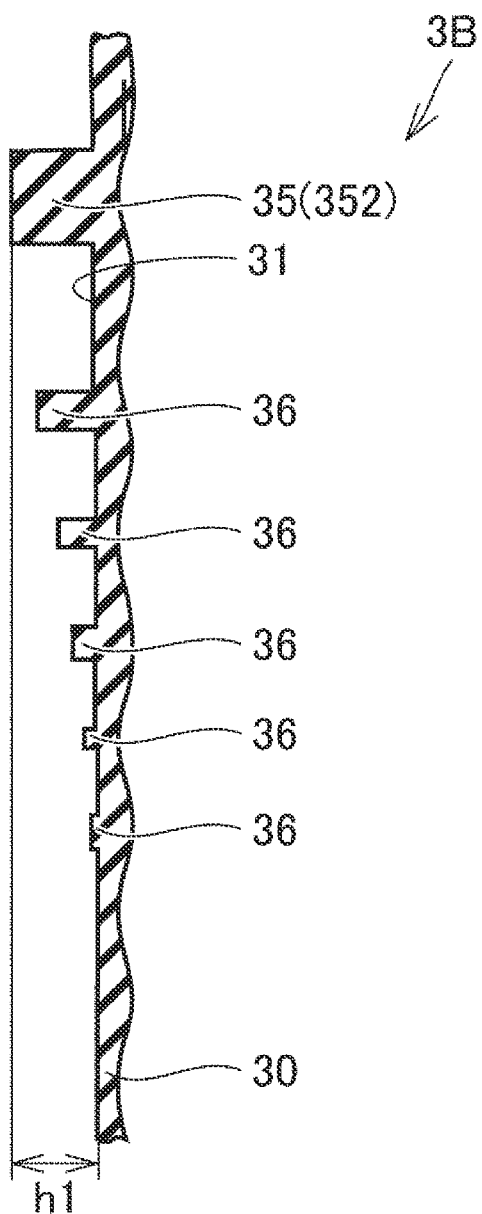
FIG. 11 is a cross-sectional view of a part of a vertical cross section of a spacer according to a second modified example.

FIG. 11 is a cross-sectional view of a part of a vertical cross section of a spacer according to a second modified example. A description will be made on a spacer 3B according to the second modified embodiment with reference to FIG. 11.

As shown in FIG. 11, the spacer 3B according to the second modified example differs from the spacer 3 according to the first embodiment in a point that the heights of the plural second projections 36 differ from each other. The rest of the configuration of the spacer 3B is substantially the same as the configuration of the spacer 3.

The plural second projections 36 are provided such that the heights thereof are reduced toward the one side in the third direction. In other words, in the third direction that is orthogonal to the first direction and the second direction, the heights of the plural second projections 36 are reduced in a direction away from the first projection 35.

Also in this case, the expansion of the casing 20 can be restricted by the second projections 36, and the stress applied to each of the first projections 35 can be alleviated. As a result, it is possible to inhibit stress concentration on the first projections 35, each of which abuts the casing 20 from the time the casing 20 is not expanded, and prevent damage to the casing 20.

In addition, similar to the first modified example, the large expansion volumes can be secured for the wound electrode body 10 and the casing 20. Accordingly, the solution holding space for the electrolyte solution can further reliably be secured. As a result, the high-rate deterioration can further be inhibited. In particular, in the case where the third direction matches the direction of gravity, the electrolyte solution tends to be accumulated on the one side (a lower side) in the third direction. Thus, the high-rate deterioration can further effectively be inhibited by securing the expansion volume of the casing 20 on the lower side.

Second Embodiment

Figure 12:
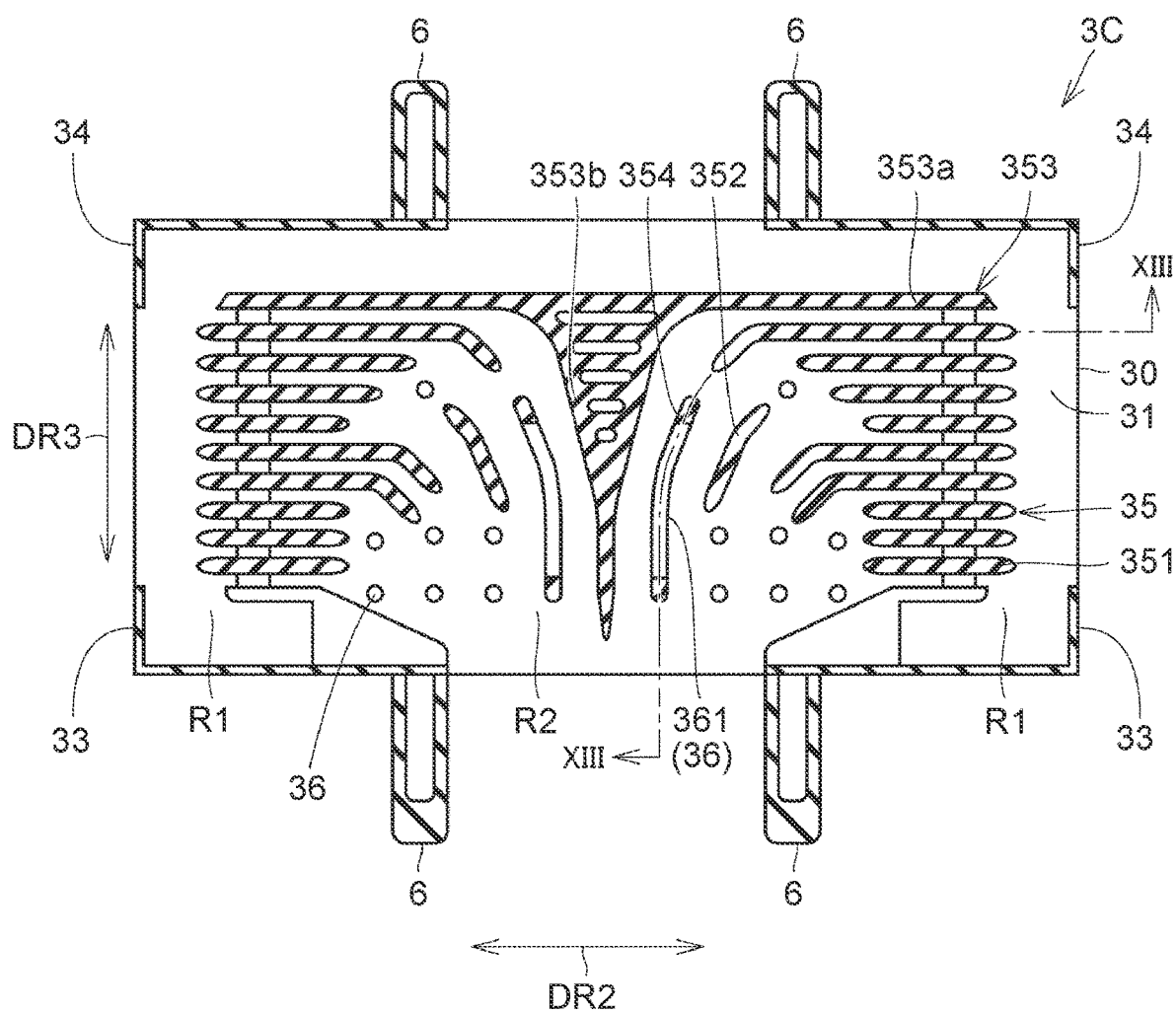
FIG. 12 is a transverse cross-sectional view of a spacer according to a second embodiment.
Figure 13:
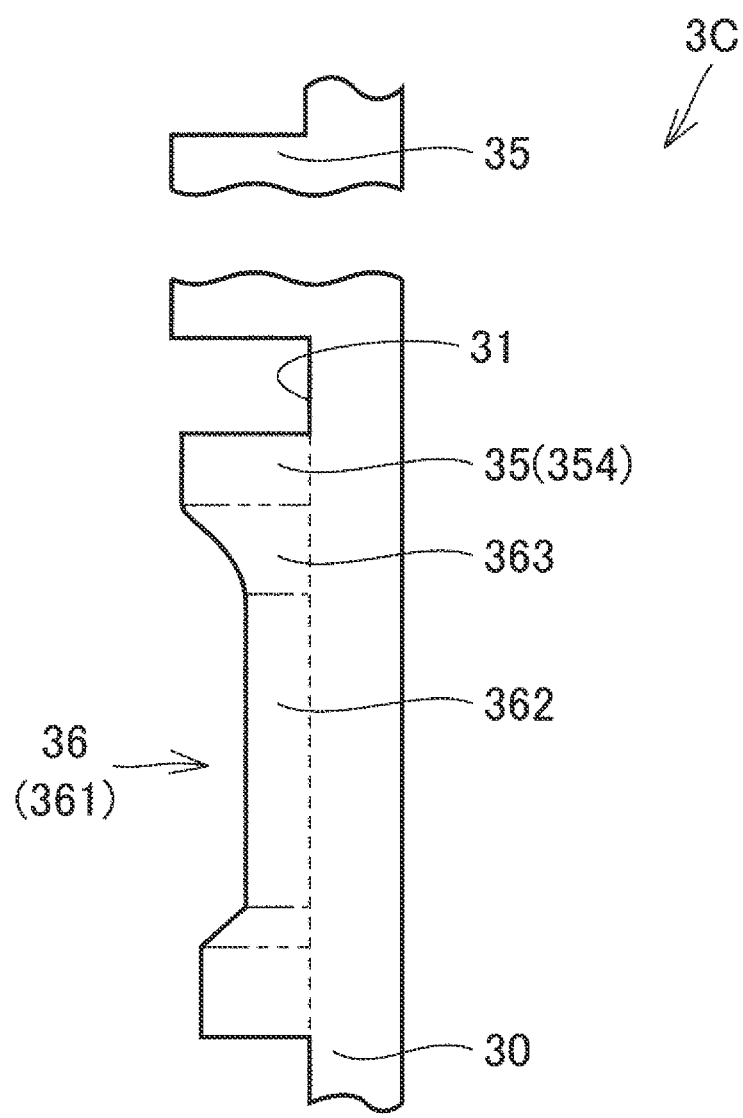
FIG. 13 is a cross-sectional view that is taken along line XIII-XIII in FIG. 12.

FIG. 12 is a transverse cross-sectional view of a spacer according to a second embodiment. FIG. 13 is a cross-sectional view that is taken along line XIII-XIII in FIG. 12. A description will be made on a spacer 3C according to the second embodiment with reference to FIG. 12 and FIG. 13.

As shown in FIG. 12 and FIG. 13, the spacer 3C according to the second embodiment differs from the spacer 3 according to the first embodiment in terms of the shapes of some of the plural second projections 36. The rest of the configuration of the spacer 3C is substantially the same as the configuration of the spacer 3.

Each of the plural second projections 36 is provided in a continuous manner with at least one of the plural first projections 35. In other words, the second projections 36 include a third projection 361 and a fourth projection. The third projection 361 is provided such that the third projection 361 contacts the first projection 35 and that a height thereof continues from the height of the first projection 35 in the first direction. The fourth projection is separately provided from the first projection 35.

More specifically, of the plural second projections 36, a central side projection 361 that is located on the central portion side of the spacer 3 in the second direction is provided to continue from a central side projection 354 of the plural first projections 35. In the second direction, the central side projection 354 is located on the central portion side of the spacer 3 from the first region R1.

The central side projection 361 includes a block section 362 and a connection section 363. The block section 362 is provided to be lower than the first projection 35 and have a constant height. The connection section 363 connects a top surface of the block section 362 and a bottom surface of the central side projection 354. The connection section 363 is gradually tilted. In this way, a step between the central side projection 354 (the first projections 35) and the central side projection 361 (the second projections 36) can be smoothed.

Also with such a configuration, the expansion of the casing 20 can be restricted by the second projections 36, and the stress applied to each of the first projections 35 can be alleviated. As a result, it is possible to inhibit the stress concentration on the first projections 35, each of which abuts the casing 20 from the time the casing 20 is not expanded, and the damage to the casing 20.

In addition, since the connection section between the first projection 35 and the second projection 36 is smoothly formed, the stress applied to the first projection 35 can be alleviated.

Furthermore, the central side projection 361 extends along the third direction, for example. Accordingly, it is possible to increase an area of the central side projection 361 that contacts the casing 20 at the time when the casing 20 is expanded for the specified volume. As a result, the stress applied to the first projection 35 can further be alleviated.

The number of the first projection 35 and the number of the second projection 36 in the first embodiment, the second embodiment, and the first and second modified examples described above can appropriately be changed within the scope that does not depart from the gist of the present disclosure. The number of the second projection 36 may be singular or plural.

The embodiments disclosed herein are illustrative in all respects and not restrictive. The scope of the present disclosure is defined by the claims and includes all modifications falling within the claims and equivalents thereof.

What is claimed is:
1. A battery pack comprising:
a first unit battery including: a wound electrode body in which a winding axis extends along a second direction that is orthogonal to a first direction; and a casing that accommodates the wound electrode body and an electrolyte solution;
a second unit battery that opposes the first unit battery in the first direction; and
a spacer that is arranged between the first unit battery and the second unit battery, the spacer including: a primary surface that faces the first unit battery; and plural projections, each of which is projected from the primary surface toward the first unit battery side, wherein
the plural projections include: a first projection that abuts the casing in a state where the casing is not expanded; and a second projection, a height of which is lower than a height of the first projection in the first direction,
the second projection is configured to abut the casing so as to alleviate stress applied to the first projection in a state where the casing is expanded for a specified volume, the first projection includes a first rib and a second rib, the first rib is at least in each of paired first regions of the primary surface, the paired first regions being regions that respectively overlap ends of the wound electrode body in the second direction when seen in the first direction, the second projection is at least in a second region of the primary surface, the second region being a region located between the paired first regions, the second projection is on one side of the spacer in a third direction that is orthogonal to the first direction and the second direction, and a portion of the second rib of the first projection is on another side of the spacer in the third direction and extends from one side to another side of the spacer in the second direction.

2. The battery pack according to claim 1, wherein the second projection is apart from the first projection.

3. The battery pack according to claim 1, wherein heights, in the first direction, of a plurality of the second projections differ from each other.

4. The battery pack according to claim 1, wherein in the third direction that is orthogonal to the first direction and the second direction, heights of a plurality of the second projections are gradually reduced in a direction away from the first projection.

5. The battery pack according to claim 1, wherein a plurality of the first rib of the first projections extend from both end sides of the spacer toward a central side of the spacer in the second direction and are aligned in the third direction that is orthogonal to the first direction and the second direction.

6. The battery pack according to claim 1, wherein the second projection includes a third projection and a fourth projection, the third projection is configured that the third projection contacts the first projection and that a height of the third projection in the first direction continues from the height of the first projection, and the fourth projection is apart from the first projection.

7. The battery pack according to claim 6, wherein the third projection extends along the third direction that is orthogonal to the first direction and the second direction.

8. The battery pack according to claim 1, wherein another portion of the second rib of the first projection extends between the paired first regions, from the portion of the second rib on the another side of the spacer in the third direction to the one side of the spacer in the third direction.

9. The battery pack according to claim 8, wherein a width of the another portion of the second rib is reduced toward the one side of the spacer in the third direction from the another side of the spacer in the third direction.

* * * * *